US012789138B2

(12) United States Patent
Bachmann

(10) Patent No.: US 12,789,138 B2
(45) Date of Patent: Nov. 10, 2026

(54) FILTER SYSTEM AND SEPARATION METHOD

(71) Applicant: KETEK GmbH Halbleiter-und Reinraumtechnik, Munich (DE)

(72) Inventor: Michael Bachmann, Munich (DE)

(73) Assignee: KETEK GmbH Halbleiter- und Reinraumtechnik, Munich (DE)

( * ) Notice: Subject to any disclaimer, the term of this patent is extended or adjusted under 35 U.S.C. 154(b) by 537 days.

(21) Appl. No.: 18/316,184

(22) Filed: May 11, 2023

(65) Prior Publication Data

US 2023/0415096 A1 Dec. 28, 2023

(30) Foreign Application Priority Data

May 12, 2022 (DE) ......................... 102022111960.2

(51) Int. Cl.
*B01D 53/32* (2006.01)

(52) U.S. Cl.
CPC ...... *B01D 53/323* (2013.01); *B01D 2257/504* (2013.01); *B01D 2258/01* (2013.01)

(58) Field of Classification Search
CPC ............ B01D 53/323; B01D 2257/504; B01D 2258/01; B01D 2247/02; B01D 2257/7027; B01D 2258/0283; B01D 2258/06; B01D 2259/812; B01D 53/62; B01D 53/72; B01D 53/76; B01D 53/32; B01D 46/50; B03C 3/12; B03C 3/38; B03C 3/383; B03C 3/49; B03C 3/60; B03C 5/02; B03C 3/41; H05H 1/47; H05H 2245/15; H05H 2245/30; H05H 1/2406
USPC ............................................. 250/282, 396 R
See application file for complete search history.

(56) References Cited

U.S. PATENT DOCUMENTS

| | | | | |
|---|---|---|---|---|
| 2011/0171094 A1 | | 7/2011 | Zahedi | |
| 2014/0216253 A1* | | 8/2014 | Scarth ................ | B01D 53/1475 166/305.1 |
| 2023/0134647 A1* | | 5/2023 | Murakami ................ | H01J 1/90 313/268 |

FOREIGN PATENT DOCUMENTS

| | | | |
|---|---|---|---|
| DE | 19919623 | A1 | 11/2000 |
| DE | 102011007470 | A1 | 10/2012 |
| JP | H04244213 | A | 9/1992 |
| JP | 2002361029 | A | 12/2002 |
| WO | 2020022599 | A1 | 1/2020 |
| WO | 2021193237 | A1 | 9/2021 |

OTHER PUBLICATIONS

Chantry, P.J., "Dissociative Attachment in Carbon Dioxide," The Journal of Chemical Physics, https://doi.org/10.1063/1.1678736, Jun. 5, 1972, 4 pages.

(Continued)

*Primary Examiner* — Michael Maskell
(74) *Attorney, Agent, or Firm* — Slater Matsil, LLP

(57) ABSTRACT

In an embodiment a filter system includes a fluid channel configured to guide a fluid to be separated into at least two constituents, an ionizer in or at the fluid channel, the ionizer configured to at least partially ionize the fluid into ions, and a separation unit in or at the fluid channel, the separation unit arranged downstream of the ionizer and configured to separate the at least two constituents from one another and to guide them separately from one another.

16 Claims, 5 Drawing Sheets

(56) References Cited

OTHER PUBLICATIONS

Ito, T. et al., "Electrostatic Separation of Carbon Dioxide by Ionization in Bifurcation Flow," Aerosol and Air Quality Research, vol. 4, No. 1, Jun. 29, 2004, 14 pages.
Kumaravel, V. et al., "Photoelectrochemical Conversion of Carbon Dioxide (CO2) into Fuels and Value-Added Products," ACS Entergy Lett., https://doi.org/10.1021/acsenergylett.9b02585, Jan. 8, 2020, 117 pages.
Xu, C. et al., "Scientists discover triboionization in discontinuous atmospheric pressure inlet for miniature ion trap mass spectrometer," Phys Org, Dec. 7, 2021, 3 pages.
Smith, D.W. et al., "A Process for Capturing CO2 from the Atmosphere," Joule, CellPress, Aug. 15, 2018, 27 pages.

* cited by examiner

FILTER SYSTEM AND SEPARATION METHOD

CROSS-REFERENCE TO RELATED APPLICATIONS

This application claims the benefit of German Application No. 102022111960.2, filed on May 12, 2022, which application is hereby incorporated herein by reference.

TECHNICAL FIELD

A filter system is specified. In addition, a separation method for such a filter plant is specified.

BACKGROUND

International Application Nos. WO 2020/022599 A1 and WO 2021/193237 A1 concern electron emitters with a substrate, an insulating layer and a gate electrode.

US Application No. 2014/0216253 A1 relates to a $CO_2$ separation process.

SUMMARY

Embodiments provide a filter system with which components of gases can be reliably separated.

According to at least one embodiment, the filter system is a gas filter system. That is, a fluid to be filtered may be a gas or may also be a liquid.

According to at least one embodiment, the filter system comprises one or more fluid channels. The at least one fluid channel is configured to guide a fluid. The fluid is a gas or a gas mixture or also a liquid or a liquid mixture. Preferably, the fluid is a gas mixture, wherein the gas mixture may also carry solid components, such as smoke particles.

According to at least one embodiment, the filter system is configured to separate the fluid into two or more than two constituents. In other words, the fluid, in particular the gas, can be fractionated by means of the filter system.

It is possible that the separation is a substantially complete separation, so that at least one of the constituents of the gas is completely or predominantly filtered out. Predominantly means, for example, filtering out at least 70% or at least 90% or at least 95% or at least 99.5% of the constituent in question. In this context, it is possible that the separated constituent is pure in type. Sort-pure means, for example, that the separated constituent has a mass fraction of a separated fluid fraction of at least 70% or at least 90% or at least 95% or at least 99.5%.

Alternatively, the constituent to be filtered is merely concentrated. This means, for example, that at most 80% or at most 50% or at most 30% of the constituent to be filtered is removed from the fluid and/or that the constituent separated from the fluid has a mass fraction of the separated fluid fraction of at most 80% or at most 50% or at most 30%.

In other words, complete and/or pure filtering of the constituent to be separated from the fluid is possible, as is concentrating. The filtering of the component to be separated can be carried out in a single-stage or multi-stage process.

According to at least one embodiment, the filter system comprises one or more ionizers. The at least one ionizer is located in or at the fluid channel. The at least one ionizer is configured to partially or completely ionize the fluid into ions. The ionizer is preferably an electron source, such that the ions are generated by means of collisions with electrons. The ionizer may alternatively or additionally be equally configured for field ionization, for triboionization, for photoionization, for plasma ionization and/or for electrospray ionization. It is further possible that several different types of ionizers are combined, for example, an electron source with a photo ionizer.

According to at least one embodiment, the filter system comprises one or more separation units. The at least one separation unit is located in or at the fluid channel and is arranged downstream of the ionizer or at least one of the ionizers along a fluid flow. That is, the fluid first flows past at least one of the ionizers and then past the at least one separation unit.

According to at least one embodiment, the at least one separation unit is configured to separate the at least two constituents from each other and to remove them separately from each other, in particular in connection with the fluid channel. The separation in the separation unit can be effected electro-mechanically, for example, by an applied electric or magnetic field in combination with openings in a filter plate. Likewise, fluid-dynamic separation is possible, for example, by utilizing different flow velocities and/or specific charges of the different ions previously generated. Furthermore, chemical separation is possible, for example, by absorption or adsorption.

In at least one embodiment, the filter system, in particular the gas filter system, comprises:

- a fluid channel for guiding a fluid to be separated into at least two constituents,
- an ionizer in or at the fluid channel, which is configured to ionize the fluid at least partially into ions, and
- a separation unit in or at the fluid channel, which is arranged downstream of the ionizer and is configured to separate the at least two constituents from one another and to guide them separately from one another.

With the filter system described here, efficient, energy-saving separation of substances, for example, greenhouse gases such as $CO_2$ or methane, from air is possible, as is the removal of pollutants from a gas. This takes advantage of the fact that low-energy electrons can be efficiently generated, in particular by means of a GIS-EE, see below, for a selective ionization of gas components. The generated ions can then be effectively separated from a remainder of the gas, so that filtering or purification is possible. However, instead of a GIS-EE, other electron sources, such as vacuum-encapsulated electron sources with electron transmission windows, can be used in the same way.

According to at least one embodiment, the ionizer comprises a gate-insulator-substrate electron-emission structure, GIS-EE, or is a GIS-EE. The GIS-EE is arranged to emit low-energy electrons. By means of these electrons, the ions can be generated.

Here, a tunnel current is generated by an applied potential at the gate electrode. The electrons first tunnel into the conduction band of the transfer layer, also known as the insulator layer. With a suitable choice of material, it is possible for the scattering to be minimized in both the insulator layer and the gate electrode, allowing the electrons to absorb energy in the electric field and perform the vacuum work function. Thus, an electron source can be realized which can be operated in ambient pressure as well as in liquids.

According to at least one embodiment, the GIS-EE is configured to emit the electrons with a kinetic energy of at least 0 eV or at least 1.5 eV or at least 6 eV, in particular to emit them into the fluid. Alternatively or additionally, this energy is at most 100 eV or at most 50 eV or at most 20 eV. Optionally, an energy of the electrons generated by the GIS-EE can be tuned, for example, by varying a voltage between the substrate and the gate electrode or by applying a further layer stack of insulator and gate electrode on the GIS-EE in order to be able to adjust the energy of the emitted electrons with the additional electrode potential.

Thus, by using a suitable stack, for example, hBN and pyrolitic graphite for the insulator layer and the gate electrode, a very narrow band spectrum of the emitted electrons can be obtained with respect to their energy and thus the ionization energy of a target medium, so that the fluid can be filtered via the electron energy.

According to at least one embodiment, the GIS-EE comprises an electrically conductive substrate. The substrate may be the component mechanically supporting and sustaining the GIS-EE. It is possible for the substrate to be mechanically rigid so that the GIS-EE does not deform in the intended use. Alternatively, the substrate can be mechanically flexible and designed as a film.

It is possible for an electrically conductive layer together with a carrier to take the place of the electrically conductive substrate. Such an electrically conductive layer can then be attached to the carrier, whereby the carrier mechanically assumes the role of the substrate and need not be electrically conductive.

Thus, the substrate can also be referred to as a substrate electrode.

According to at least one embodiment, the GIS-EE comprises a transfer layer of a material having a bandgap that is larger than the bandgap of the substrate or the electrically conductive layer. For example, the band gap of the material of the transfer layer is at least 2 eV or at least 3 eV or at least 4 eV or at least 5 eV. The transfer layer may be an insulating layer of a dielectric material. The transfer layer is preferably disposed directly on the electrically conductive substrate or, alternatively, directly on the electrically conductive layer.

According to at least one embodiment, the GIS-EE comprises a gate electrode made of a further electrically conductive material. The further electrically conductive material may differ from the material of the electrically conductive substrate or the electrically conductive layer, or it may also be the same material. In particular, the gate electrode is attached directly to a side of the transfer layer facing away from the electrically conductive substrate or the electrically conductive layer.

According to at least one embodiment, the GIS-EE comprises at least one first electrical connection structure. The first electrical connection structure serves to electrically connect the electrically conductive substrate or the electrically conductive layer. The first electrical connection structure may be, for example, a metallic electrical lead.

According to at least one embodiment, the GIS-EE comprises at least one second electrical connection structure. The second electrical connection structure is used to electrically connect the gate electrode. The second electrical connection structure can be, for example, a metallic electrical lead. It is possible for the second electrical connection structure to extend over the entire surface of the gate electrode, for example, in the form of a grid or in the form of strips, or for the gate electrode to be contacted by the second electrical connection structure only at points, for example, at one or more electrical connection points and/or along a lateral edge.

According to at least one embodiment, the gate electrode comprises carbon or consists of carbon. For example, the gate electrode is then a graphene layer, a graphene layer stack, or a graphite layer.

According to at least one embodiment, the gate electrode is thin. For example, a thickness of the gate electrode is then at least one atomic layer or at least 1 nm. Alternatively or additionally, this thickness is at most 15 nm or at most 10 nm or at most 5 nm.

According to at least one embodiment, the ionizer, in particular the GIS-EE, comprises or consists of a plurality of lamellae, each configured to emit the electrons. Alternatively, a plurality of ionizers, in particular a plurality of the GIS-EEs, is provided, each of which is configured as a lamella. Lamella means, for example, that the corresponding structure is to be regarded as two-dimensional, so that in particular a length and/or a width of the corresponding structure are greater than a thickness of the corresponding structure by at least a factor of 10 or by at least a factor of 20. These lamellae can also be realized on a substrate by a surface structure, for example, as etched trenches in silicon.

According to at least one embodiment, each of the lamellae comprises a sub-area of the gate electrode of the GIS-EE. It is possible that these sub-regions are aligned parallel to each other and/or are each adjacent to the fluid channel.

According to at least one embodiment, the ionizer, in particular the GIS-EE, has a plurality of holes extending there-through. That is, the ionizer, in particular the GIS-EE, then comprises the holes and the holes extend completely through the ionizer. In particular, the holes extend in a straight line through the ionizer. In other words, the ionizer, in particular the GIS-EE, may have a grid-like configuration.

According to at least one embodiment, the fluid channel comprises the holes. In other words, the holes are part of the fluid channel or form the fluid channel.

According to at least one embodiment, the fluid channel is partially or completely radially surrounded by the at least one ionizer, in particular the at least one GIS-EE. For example, the ionizer is then formed as a cylinder jacket or cone jacket or as part of a cylinder jacket or cone jacket around the fluid channel. Gas inlet openings or gas outlet openings may extend through the at least one ionizer.

Alternatively, the at least one ionizer, in particular the at least one GIS-EE, is located only on one side or on two opposite sides of the fluid channel. This applies in particular if the at least one ionizer, especially the GIS-EE, is plate-shaped or is composed of several lamellae arranged in a common plane.

According to at least one embodiment, the ionizer includes a field ionizer or is a field ionizer. In particular, the at least one field ionizer includes a plurality of needles. The fluid may be guided along a surface of the field ionizer, in particular along the needles, and/or through micro-channels in the needles, such that ionization occurs at tips of the needles during operation. In the case of a liquid, this is also referred to as electrospray ionization, and charged droplets can also be formed in addition to the ions, which can be further ionized by atomization and evaporation of carrier components, such as solvents.

According to at least one embodiment, a first one of the constituents of the fluid to be separated is $CO_2$. That is, the filter system is configured to reduce a $CO_2$ content of the fluid. In this case, the fluid is in particular air or a combustion exhaust gas.

According to at least one embodiment, a second one of the constituents of the fluid is benzene, so that the filter system is configured to reduce a benzene content of the fluid. In this case, the fluid, in particular gas or air, has a toluene content.

According to at least one embodiment, the separation unit comprises several partial stages, also referred to as sub-stages. The partial stages are preferably arranged in cascade along the fluid channel. It is possible that at least one further ionizer is arranged between adjacent partial stages. Furthermore, it is possible that several partial stages are arranged parallel to each other for greater scaling of the filter system. It is also possible that ionization and separation take place continuously along the fluid flow to achieve a higher separation efficiency.

For continuous ionization, for example, the GIS-EE may be mounted on one or more sides of a flow channel, that is, for example, in a plane-parallel manner, and there may be at least one outlet on one or more other sides, that is, for example, in a grid-shaped manner. A voltage applied to the at least one outlet may cause the generated ions to be removed. This can be implemented not only at a discrete, point-like location, but also along longer distances.

For example, several GIS-EEs, for example, in the form of semiconductor chips, can be arranged adjacent to each other to realize the required area. The various GIS-EEs can optionally be controlled independently of each other. By means of independently controllable GIS-EEs, it is also possible to emit electrons with different energies along the fluid channel in order to promote and/or trigger specific reactions in particular places.

According to at least one embodiment, a first one of the partial stages is configured to decompose smoke particles, for example, by means of plasma ionization. That is, the first one of the partial stages can effect smoke particle cleaning or smoke particle removal, in particular by partially or completely destroying the smoke particles.

According to at least one embodiment, a second one of the partial stages is configured to discharge ionized nitrogen so that a concentrating of at least one of the at least two constituents occurs during operation. That is, nitrogen can be removed so that proportionately more of the constituent to be filtered out remains in the treated fluid. The separation of the nitrogen is possible, for example, by a suitably selected energy of the electrons used for the ionization and generated by the ionizer.

According to at least one embodiment, a third one of the partial stages is configured to remove ionized oxygen so that a further concentrating of at least one of the at least two constituents takes place during operation. That is, oxygen can be removed so that proportionately more of the constituent to be filtered out remains in the treated fluid. The separation of the oxygen is possible, for example, by a suitably selected energy of the electrons used for the ionization and generated by the ionizer.

In addition to nitrogen and oxygen, other fluid constituents can be separated in the same manner. That is, sequential separation of gases can be performed based on their ionization levels until the at least one constituent to be filtered out remains or until the at least one constituent to be filtered out has the next following ionization level.

According to at least one embodiment, a fourth one of the sub-stages is arranged to change a trajectory of the ions depending on their flow resistance in the gas, so that the ions are selected in operation depending on their size and mass. For this purpose, the separation unit may comprise one or more electrodes arranged for acceleration and/or for generating an electric or magnetic field.

According to at least one embodiment, the filter system further comprises an energy recovery unit. The at least one energy recovery unit is adapted to collect at least a portion of the ions and/or electrons used for ionization. For example, the charge of the ions and/or electrons can be recovered so that a voltage can be generated via a charge separation, for example, to supply an electron source, or so that a current flow can also be generated. Thus, at least part of the ionization energy and/or the energy of the electrons can be recovered.

According to at least one embodiment, the filter system further comprises a subsequent reaction unit. The subsequent reaction unit is configured to utilize the ions for a subsequent reaction. For example, the low energy electrons may cause dissociation into CO+O or C+O. Furthermore, for example, negatively charged $CO_2$ ions can be used in conjunction with hydrogen to produce chemicals such as carbon monoxide (CO), formaldehyde (HCHO), formic acid (HCOOH), methanol ($CH_3OH$), ethanol ($CH_3CH_2OH$), isopropanol ($CH_3CH(OH)CH_3$), and/or methane ($CH_4$), see, for example, the Vignesh Kumaravel et al., Photoelectrochemical Conversion of Carbon Dioxide ($CO_2$) into Fuels and Value-Added Products, in CS Energy Lett. 2020, 5, 2, 486-519, https://doi.org/10.1021/acsenergylett.9b02585.

According to at least one embodiment, an area of the ionizer facing the fluid and configured for emission of the electrons is large. For example, this area is at least 1 cm 2 or at least 1 $dm^2$ or at least 0.1 $m^2$. With such large areas, a large amount of fluid can be efficiently separated in a short time. This is especially possible for GIS-EEs with holes or fins. In addition, a large number of GIS-EEs can be combined with each other as an electron source.

$$13.8\ \text{eV}\cdot\frac{10^6\ \text{g}}{44\ \frac{\text{g}}{\text{mol}}}\cdot 6.02\times10^{23}\ \frac{1}{\text{mol}} = 30.1\ GJ = 8.36\ \text{MWh/t\_CO}_2$$

Assuming an efficient electron source, high energy is nevertheless required to generate the ions. A common process for $CO_2$ separation requires about 0.72 MWh per ton of $CO_2$ for the filtering-only process; see, for example, the document D. W. Keith, A Process for Capturing $CO_2$ from the Atmosphere, in Joule 2, 1573-1594, Aug. 15, 2018. There, a two-stage process is used, with $CO_2$ being removed from a filter medium in a second step by heating. To achieve the specified energy, part of the heating energy is recovered by a heat exchanger, that is, the gas flowing into the second stage is heated by the outflowing one, which is thereby cooled. However, the ionization energy of one ton of $CO_2$ is $$13.8\ \text{eV}\cdot\frac{10^6\ \text{g}}{44\ \frac{\text{g}}{\text{mol}}}\cdot 6.02\times10^{23}\ \frac{1}{\text{mol}} = 30.1\ GJ = 8.36\ \text{MWh/t\_CO}_2.$$

$$13.8\ \text{eV}\cdot\frac{10^6\ \text{g}}{44\ \frac{\text{g}}{\text{mol}}}\cdot 6.02\times10^{23}\ \frac{1}{\text{mol}} = 30.1\ GJ = 8.36\ \text{MWh/t\_CO}_2$$

An additional emission efficiency limited to less than 100% would have to be taken into account. That is, similar to the above processes, this energy would have to be recovered to ensure an efficient process. This can be done, for example, by feeding a power supply through the neutralization of the ions produced.

In addition, efficiency is increased if the $CO_2$ ions and radicals produced are used directly for further processing, since energy can be saved for this step.

Also disclosed is a separation method for a filter system as described in connection with one or more of the above embodiments. Features of the filter system are therefore also disclosed for the separation method and vice versa.

In at least one embodiment, the separation method comprises the following steps, for example, in the order indicated:

passing the fluid to be separated through the fluid channel past the ionizer, at least partially ionizing the fluid with the ionizer, at least partially separating the at least two constituents of the fluid from each other with the separation unit.

BRIEF DESCRIPTION OF THE DRAWINGS

In the following, a filter system and a separation method described here are explained in more detail with reference to the drawing on the basis of embodiment examples. Identical reference signs indicate identical elements in the individual figures. However, no references are shown to scale; rather, individual elements may be shown in exaggerated size for better understanding.

DETAILED DESCRIPTION OF ILLUSTRATIVE EMBODIMENTS

Figure 1:
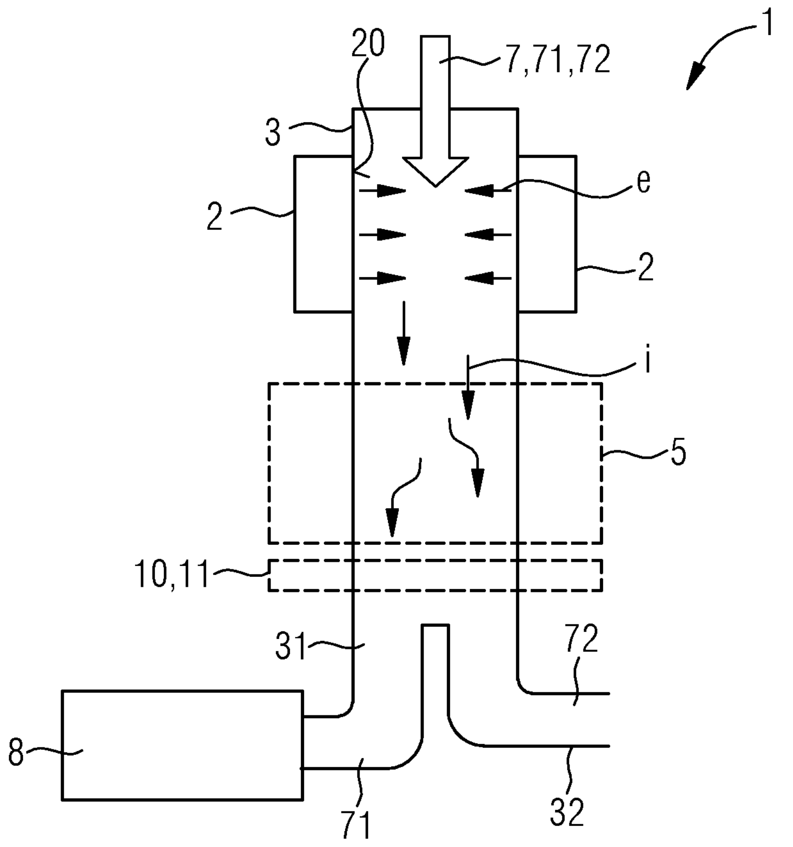
FIG. 1 shows a schematic sectional view of an example of a filter system.

FIG. 1 shows an example of a gas filter system 1. The gas filter system 1 comprises a fluid channel 3, at which an ionizer 2 is located. The ionizer 2 is configured to at least partially ionize a fluid 7 flowing through the fluid channel 3 and comprising a plurality of constituents 71, 72. For example, the ionizer 2 emits low-energy electrons e for this purpose.

A separation unit 5 follows the ionizer 2 along the fluid channel 3. The separation unit 5 is configured to separate the constituents 71, 72, at least some of which are in the form of ions i, from one another. This may involve complete separation of the constituents 71, 72 or at least one of the constituents 71, 72 may be concentrated. The constituents 71, 72 can be passed through different channels 31, 32.

Optionally, a storage unit 8 follows the separation unit 5. In the storage unit 8, the separated or concentrated constituent 71 can be stored permanently or temporarily. The remaining fluid 7, for example, the constituent 72, can then be discharged, for example, into the environment, in particular into the ambient air. The storage unit 8 is, for example, a $CO_2$ storage unit.

As a further option, the gas filter system 1 may comprise an energy recovery unit 10 and/or a follow-up reaction unit 11. For example, in the energy recovery unit 10 an energy of the ions i still present is used to build up a voltage and thus a power source. In the subsequent reaction unit 11, for example, the ions i may be used to allow a further chemical reaction to take place.

The energy recovery unit 10 and/or the follow-up reaction unit 11 are, for example, arranged downstream of the separation unit 5 and can be arranged upstream of the storage unit 8, for example, upstream of a splitting into the channels 31, 32. In contrast to what is shown in FIG. 1, the energy recovery unit 10 and/or the follow-up reaction unit 11 can also be arranged in one of the channels 31, 32, in particular in the second channel 32, which carries the second constituent 72. Furthermore, it is in principle possible that the energy recovery unit 10 and/or the follow-up reaction unit 11 are also mounted between the ionizer 1 and the separation unit 5. If both the energy recovery unit 10 and the follow-up reaction unit 11 are present, these components 10, 11 may be placed at different locations and/or between different components 2, 5, 8 of the filter system 1 along the fluid channel 3.

Molecules can be separated after ionization by different specific properties. One idea underlying the gas filter system 1 described here is to combine one or more sub-stages according to different principles depending on the species, that is, the type of molecule, in order to achieve highly efficient and sensitive filtration. This process can be used, for example, to filter $CO_2$ from the atmosphere and, in this respect, can be more energy-efficient compared to methods such as amine scrubbing, on the one hand, because in the separation process described here, in particular, no heating step to about 100° C. as well as no pressure reduction to about 50 mbar are necessary. In addition, the separation process described here can also be used in polluted atmospheres such as chimneys, exhausts or in cities.

Another possible application is the detection of benzene, which is classified as carcinogenic and usually occurs in the presence of toluene, which is very relevant in terms of occupational safety. The current occupational exposure limits are under discussion and could be further reduced in the future. This requires a measurement method for monitoring as directly as possible. An ion mobility spectrometer, IMS for short, in principle allows the necessary detection limit, but benzene is hardly measurable in the presence of toluene due to the greater electron affinity of toluene.

The separation method presented can also be used to realize a detector that first extracts both substances, for example, toluene and benzene, from nitrogen and then separates them via the different electron affinity. Similar combinations for a detector are also possible for other molecules.

Ionization by the ionizer 2 can be achieved by several methods, for example:

Ionization by an electron source: Of particular interest here is an electron source whose emission is based on hot electrons, such as a GIS-EE, which is characterized by low supply voltages in the range of 0.5 V to 50 V and by a tunable energy of the emitted electrons. Likewise, a vacuum-encapsulated electron source with an electron transmission window is especially possible.

Field ionization with micro-tip emitter or micro-spray emitter array, that is, by means of needles having tips. In particular, these needles can also have capillaries with diameters of, for example, less than 100 μm or less than 1 μm or less than 0.1 ?Jai: Molecules can be ionized by a positive voltage, directly on needles which are the field emitters. It is also possible to pass a fluid stream through needle-shaped capillaries as the micro-electrospray emitters and to ionize through the field and/or create ionized droplets.

Triboionization: Ionization can also be achieved by a capillary or lamellar structure and by friction on walls. This can also be supported by an additional electrical voltage. Likewise, this can be realized by needle-shaped capillaries.

Photoionization: Ionization of the fluid can be achieved by a light source, for example, an X-ray source, by a UV source and/or by a laser.

Plasma ionization: Ionization can also be produced by a plasma. Here, for example, a surface plasma, also called Dielectric Barrier Discharge or DBD for short, in air or a corona discharge on a needle is possible.

In the following, only some of the realization possibilities of the ionizer 2 are described in more detail. However, all of the aforementioned realization possibilities can be used equally in all embodiments, individually or in combination.

The ionized fluid, which is in particular a gas, can be separated by, for example, the following methods, which can be used in any example and can also be combined in any way:

Ionization probability: by conditions that achieve a preferred or reduced ionization for the targeted species compared to the residual gas. This is possible, for example, by chemical gas phase ionization or atmospheric pressure chemical ionization, APCI for short, targeting different ion negativity and/or proton affinity, for example, like $N_2$ in air, which is likely to be ionized by the high concentration, but then gives up the charge to other much lower concentrated molecules, similar to the principle in an IMS.

Ionization energy: using an energetically tunable source, especially for electrons, some species can be targeted to be directly ionized or not ionized. For example, the ionization energy of $O_2$ is about 12.0 eV, which is smaller than the ionization energy of $CO_2$, which is about 13.8 eV, which in turn is smaller than the ionization energy of $N_2$ of about 15.6 eV. By choosing the energies appropriately, cascaded separation of the constituents can be performed efficiently in several steps.

Electron capture/ionization: Similar to the electron capture detector, different species capture low-energy electrons with different probabilities. This effect can also be influenced by varying the electron energy.

Ion species: Different molecules or ions are formed by ionization and a different number of positive and negative ions is formed. This can also be exploited to filter molecules and/or ions.

Ion mobility: Kinetic filtering, similar to IMS, can be used to achieve separation based on flow resistance, for example, by applying an electric field perpendicular to the flow direction of the fluid and an outlet location matching the targeted molecule. This also allows quadrupole filtering in air, for example. It is also possible to create a resonance by means of a dynamic electric or magnetic field aligned perpendicular to the fluid flow and to transfer energy only to ions of a certain mobility. By varying the fields in terms of time and strength, such as pulsed operation, the filtering can also be adapted.

Different methods could be combined to achieve a high input filter efficiency, especially close to 100%, and a high output concentration, preferably also close to 100%, of the target species. The individual methods could be performed along longer ionization paths and separation paths, and/or with discrete ionization zones and/or discrete separation zones. Some or all of the components of the gas filtration system can be implemented as MEMS devices, where MEMS stands for micro-electromechanical system. Likewise, a macroscopic and/or modular design of the components is possible, as well as volumes of the stages adapted to each other to the respective volume ratios of the input fluid.

Ion mobility is currently used for the detection of very small amounts of substances in the range of parts per billion, ppb, down to parts per trillion, ppt. At the moment, mainly ionization sources are used, which due to their limited intensity do not allow the investigation of higher concentrations. In contrast to this conventional application, ion mobility can also be used for filtering. In order to achieve higher concentrations, an ionization source with potentially higher intensities should be used. A conventionally used Ni-63 electron source corresponds to about 1 nA to 10 nA electron current at 5 keV energy. However, since a GIS-EE allows currents up to the mA range, higher concentrations and efficient filtering are thus achievable.

Different input concentrations can preferably be adjusted to a certain degree by variable operating voltages as well as varied fluid flow, for example, with valves or flow meters between the stages and different paths. This can be used, for example, to control the response time of an APCI. In addition, the sub-stages can also be controlled by temperature, pressure, intensity of ionization and/or electron energy, a time-controlled ionization, but also by an added humidity or further artificially added gas components.

Figure 2:
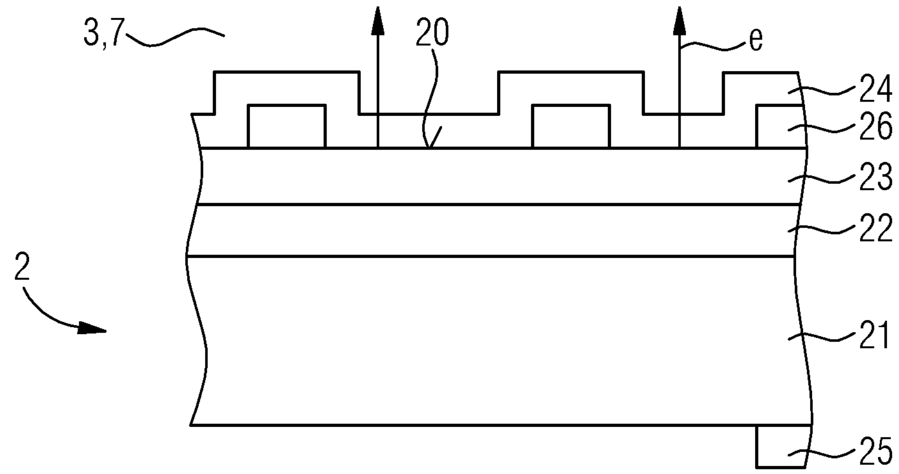
FIGS. 2 to 6 show schematic sectional views of ionizers for filter systems according to embodiments.

FIG. 2 shows an example of an ionizer 2 designed as a gate-insulator-substrate electron-emission structure, or GIS-EE. The GIS-EE includes an electrically conductive substrate 21, which may be replaced by a combination of a support and an electrically conductive layer, not drawn. Further, the GIS-EE includes a transfer layer, such as an insulator layer 22, on the substrate 21, and a gate electrode 23 on the insulator layer 22. Instead of the dielectric material, the transfer layer may be of a material with a large band gap, such as SiC, GaN, AlN, $Ga_2O_3$, or diamond, as also possible in all other embodiments. The gate electrode 23 forms an emission side 20 for the electrons. A first and a second electrical connection structure 25, 26 are optionally provided for electrical contacting.

It is possible that the second electrical connection structure 26 is applied to the gate electrode 23 as a grid or structured in strips to provide a uniform voltage across the gate electrode 23.

Further, it is possible that a protective layer 24 is present covering the gate electrode 23. Optionally, portions of the second electrical connection structure 26 extending over the gate electrode 23 are located between the gate electrode 23 and the protective layer 24.

Electrons can thus tunnel into the conduction band of the insulator 22 by field emission. If there is a sufficient voltage drop and low scattering probability, these hot electrons can be emitted through the gate electrode 23 into the fluid channel 3. The achievable energy is limited by the dielectric strength and/or by the lifetime of the insulator layer 22. With the voltage, for a given thickness of the insulator layer 22, the tunneling current and thus the load increases and thus the lifetime decreases. To a certain extent, the thickness of the insulator layer 22 can be increased to reduce the tunnel current at a given voltage, but in doing so, scattering effects increase, decreasing efficiency. Similarly, the maximum charge transported by the tunneling process before a breakdown can decrease with increasing thickness.

An energy range for the emitted electrons of, for example, up to 50 eV is possible. In this type of electron emitter, the actual tunnel barrier is the interface between the insulator 22 and the substrate 21, which is thus not exposed to the influence of the environment. This principle thus works not only in vacuum but also at atmospheric pressure as well as in liquids, making an evacuated package superfluous. Since the electron energy can be adjusted in a certain range via the voltage and/or via the thickness of the insulator 22, an electron source with variable electron emission energy can thus be realized, if necessary also by a plurality of GIS-EEs with different thicknesses of the insulator layer 22, for example, on a common substrate 21. Alternatively, another gate insulator stack can be used to vary the energy. The other gate insulator stack is composed, for example, of a further insulation layer and a further gate electrode stacked in particular directly on top of the gate electrode of the GIS-EE; for the further insulation layer and the further gate electrode, the same as for the insulation and for the gate electrode, respectively, applies in the same way. Accordingly, the protection layer can be applied on the further gate electrode, and another electric contact structure can make electric contact with the further gate electrode.

In order to achieve the lowest possible scattering in the gate electrode 23 and at the interface to the insulator 22, the gate electrode 23 should be made as thin as possible on the one hand. For example, a thickness of the gate electrode 23 is in the range of the wavelength of the electrons, that is, at most 10 nm. In addition, the gate electrode 23 should have a small energy difference of the conduction band edge to the conduction band edge of the insulator 22 in order to minimize quantum mechanical reflection.

Moreover, due to the requirement of small film thickness, the conductivity of a material of the gate electrode 23 should be selected as high as possible to realize a low voltage drop across the gate electrode 23 and thus the possibility of the largest possible active areas.

One possibility is carbon-based gate electrodes 23. Here, on the one hand, a diamond or diamond-like, that is, sp3 hybridized dominated, as well as a graphite-like, that is, sp3 hybridized dominated, design of the gate electrode 23 can be considered. Carbon materials in both forms exhibit very high, possibly direction-dependent electrical conductivities, as well as very high electron transmission. This is particularly true for graphene.

A semiconductor-based gate electrode 23 can also provide a small energy jump to the insulator conduction band. For example, with a silicon oxide as the insulator layer 22, silicon can also be considered as the material for the gate electrode 23.

Metals, in particularly thin layers, can also be considered for the gate electrode 23. In particular, metal layers produced by atomic layer deposition, ALD for short, can be homogeneous and very thin.

Examples of $sp^2$ hybridized dominated carbon based materials for gate electrode 23 include: graphene, multilayer graphene, two-layer graphene, three-layer graphene, exfoliated graphene. Materials of the graphene family can be grown and then transferred in particular catalytically, for example, using copper. The growth can be done, for example, on $SiO_2$, SiC, metals such as copper, hexagonal boron nitride or sapphire. Likewise, graphene can be grown directly on the insulator layer 22 without subsequent transfer, for example, on hexagonal boron nitride. Furthermore, solid phase graphene growth, such as HOPG (Highly Oriented Pyrolytic Graphite) with subsequent transfer can be relied upon. Furthermore, the use of nanocrystalline graphene, pyrolytic graphene, pyrolytic carbon, graphitic carbon or graphenic carbon is possible. Possible production methods are chemical vapor deposition, CVD for short, such as APCVD (Atmospheric Pressure CVD), LPCVD (Low Pressure CVD), PECVD (Plasma-enhanced CVD) or ECVD (Electro CVD), furthermore physical vapor deposition, PVD for short, as well as transfer methods. So-called glassy carbon or pyrolized polymer films can be produced by pyrolysis.

Examples of sp3 hybridized dominated carbon based materials for the gate electrode 23 are: diamond, diamond like carbon, abbreviated DLC, ultra-nanocrystalline diamond, abbreviated UNCD, which can be doped and can be produced, for example, by CVD, such as PECVD.

Other two dimensional, 2D, materials are also conceivable, such as borophene, phosphors, or even transition metal dichalcogenides.

Examples of semiconductor materials for the gate electrode 23 include: crystalline Si, poly-Si, amorphous Si, Ge, which can be produced by CVD, such as LPCVD.

Examples of metals for the gate electrode 23 are: Al, Au, Ag, Pt, Ni, Co, which are, for example, producible by ALD.

For example, the gate electrode 23 has a specific conductance of $10^{-1}$ S/m to $10^9$ S/m. For example, a thickness of the gate electrode 23 is at least one monolayer and at most 20 nm or at most 10 nm.

Above all, the insulator 22 should be selected to be as robust as possible against the tunnel currents used, in order to enable the highest possible current density and service life of the GIS-EE 2. A manufacturing process in which the thickness of the insulator layer 22 can be precisely controlled is preferable in order to achieve very thin homogeneous layers 22 and a high homogeneity of emission.

For example, the insulator 22 is made of silicon dioxide, since the achievable high oxide quality as well as the relatively precisely adjustable thickness allow a high current density and thus service life. Especially in combination with a silicon substrate 21, established manufacturing processes are also available. In addition, the insulator 22 can be hexagonal boron nitride, or hBN for short, which allows, among other things, direct epitaxial growth of graphene on its surface. Since the thickness can also be very well controlled by various fabrication methods, hBN is an interesting option for the insulator 22. Especially in combination with hBN as insulator layer 22 and graphene as gate electrode 23, very low-scattering tunneling processes and thus a sharp energy distribution of the emitted electrons can be realized here. The high-k dielectrics used in CMOS technology can also be considered for the insulator 22. Especially fabrication methods like ALD are able to achieve very homogeneous layers with a relatively high quality.

Silicon dioxide for the insulator 22 can be generated, for example, thermally, in particular wet, dry, at room temperature or in an oxidation furnace, or by CVD or by vapor deposition. hBN or BN can be generated, for example, by PECVD and annealing, LPCVD, cathalytic growth and transfer. High-k dielectrics such as $Al_2O_3$ or HfO can be produced by evaporation, sputtering or ALD.

For example, the insulator layer 22 has a dielectric strength of 0.1 V/nm to 500 V/nm.

With silicon as the material for the substrate 21, also referred to as the substrate electrode, common methods from the CMOS industry are available and scalable, reproducible manufacturing is achievable. By varying the doping, the electrical properties can be influenced and even a voltage drop at the gate electrode can be compensated for by a suitable doping profile. Silicon also offers the possibility of integrating further functionality on a chip.

Furthermore, for the substrate 21 Highly Oriented Pyrolitic Graphite, or HOPG for short, is possible as a highly conductive, flexible material and can provide a very good substitute for common radioactive foils, such as Ni-63, as an electron source or as an ionization source.

Sapphire, hBN, silicon carbide or even a metal or metal film are also possible for the substrate 21. In the case of a non-conductive substrate layer, conductivity can be realized by an additional layer. For example, graphene can be grown directly on its surface.

The substrate electrode 21 can thus be silicon, with a possible doping of either p or n and a doping level of –– to ++, with P, As, Sb, B, Al, Ga and/or In as possible dopants. Furthermore, HOPG and graphite foils as well as sapphire wafers, possibly with a carbon layer, and SiC, possibly with a carbon layer, can also be used, as well as metal films.

For example, a thickness of the substrate 21 is at least one monolayer and/or at most 5 mm. The substrate 21 may be mechanically rigid or flexible. For example, a specific electrical conductivity of the substrate 21 is between $10^{-1}$ S/m and $10^9$ S/m, inclusive.

Since the detector 1 may be used in air with oxygen or under aggressive environment, the protective layer 24 for the gate electrode 23 may also be necessary. Here, the chemical resistance of the protective layer 23 as well as the controlled, homogeneous deposition of even very small thicknesses is particularly important. Here again, gate dielectric manufacturing processes as well as ALD are of particular interest.

For example, the protective layer 24 can be made of silicon dioxide, as is possible for the insulator 22. In addition, the protective layer 24 can be made of hBN or BN, which allows very thin layers and is a suitable material especially in combination with graphite or graphene layers for the gate electrode 23 due to the epitaxial process. Here, in particular, the same lattice structure as for graphitic carbon would also be advantageous. Furthermore, the protective layer 24 can be glassy carbon, and especially through ALD processes, high-k dielectrics are again possible. Silicon as well as silicon carbide or silicon nitride are also possible materials for the protective layer 24, as well as $Al_2O_3$, for example, produced by high frequency sputtering processes or reactive sputtering processes or ALD.

The protective layer 24 is preferably chemically insensitive to, for example, oxygen ions and oxygen radicals. A thickness of the protective layer 24 is, for example, at least one monolayer and/or at most 10 nm.

For example, a current density of the GIS-EE is at most 100 A/cm$^2$, an emission electrode voltage may be between 0.5 V and 50 V, inclusive, and an efficiency may be up to 99% or 95% or 90%.

A functionality of the GIS-EE for ionization can be independent of pressure and type of gas or liquid in which the GIS-EE is operated.

Thus, the gas filter system 1 described herein may be based on the GIS-EE as the electron source, with emission based on hot electrons.

The fluid channel 3 can be constructed like a plate capacitor or like a cylinder capacitor, whereby openings or grid arrangements of the ionizer 2 are also possible and a gas flow from all sides is conceivable.

Figure 3:
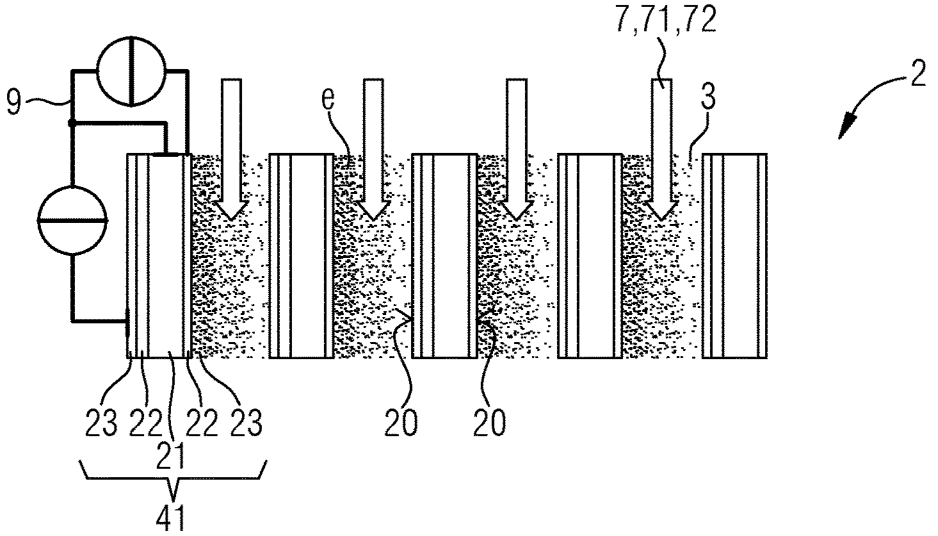

FIG. 3 shows that the ionizer 2, which in turn may be configured as a GIS-EE, is divided into a plurality of fins 41, also referred to as lamellae. For example, the lamellae 41 are arranged in a common plane, and main sides of the lamellae 41 may be oriented perpendicular to this common plane.

If the ionizer 2 is implemented as a GIS-EE, the GIS-EEs 2 can each be applied to one or also to both sides of the lamellae 41. Alternatively, one side of the lamellae 41 can also be insulating. In this case, ions can initially accumulate there and build up an opposing electrical field so that the ionized molecules are not discharged at a rear-side lamella wall. A conductive connection to a ground potential as well as to positive or negative voltages is then also possible.

A distance between adjacent lamellae 41 is, for example, at least 0.1 μm or at least 1 μm and/or at most 1 cm or at most 0.1 mm or at most 10 μm. A length of the lamellae 41 along the fluid channel 3 is, for example, at least 0.1 mm or at least 0.5 mm or at least 2 mm or at least 1 cm or at least 5 cm. It is possible that there are outlets along the lamellae 41, not drawn, to which a voltage is applied in order to discharge the generated ions also in the region of the lamellae 41. This allows for continuous ionization and ion separation. Alternatively, several of the lamellae arrangements shown in FIG. 3 can be connected in series, with intermediate outlets for the generated ions, whereby an approximately continuous ionization and ion separation is also possible. That is, the ionizer 2 and the separation unit 5 may each comprise several sub-units arranged alternatingly.

A control electronics 9 is only drawn schematically in a highly simplified form.

In all other respects, the comments on FIGS. 1 and 2 apply in the same way to FIG. 3, and vice versa.

Figure 4:
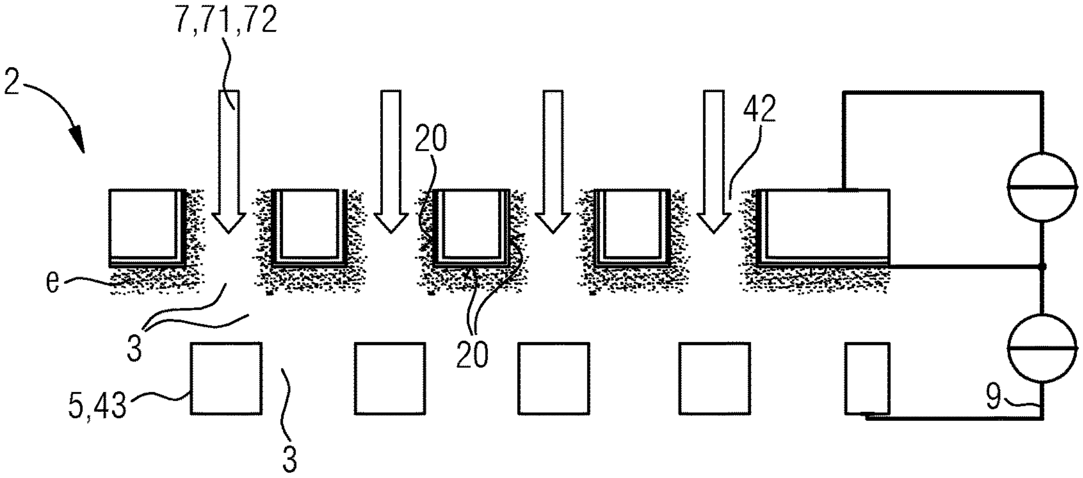

In FIG. 4 it is shown that the ionizer 2, in particular the GIS-EE, is designed in the shape of a grid, so that a plurality of holes 42 runs through the substrate 21, the insulator layer 22 and the gate electrode 23, whereby the protective layer 24 can optionally also be present, not drawn. In this regard, the insulator layer 22 and the gate electrode 23, as well as the optional protective layer 24, may be located either only on side surfaces of the holes 42, or only on sides of the substrate 2 facing the measuring unit 5, or both, as drawn in FIG. 4. It is possible that an optional associated accelerating electrode 43, which may be a part of the separation unit 5, is designed as a grid.

The holes 42 may be placed in a regular rectangular grid, seen in plan view, not shown, and cam be both either matching and aligned with the grid period of the optional accelerating electrode 43 or offset arbitrarily with respect thereto. Alternatively, other grid types are possible, for example, hexagonal grid arrangements of the holes 42.

In all other respects, the comments on FIGS. 1 to 3 apply in the same way to FIG. 4, and vice versa.

Very high intensities can be achieved with photon sources, such as XUV lasers, or with electron-based X-ray sources, as can be achieved with arc sources. However, XUV sources are usually very large and expensive and are usually operated in pulsed mode, whereas in X-ray sources only about 1% of the emitted electrons are actually converted to X-rays during the conversion of electrons to X-rays. For energy efficiency and cost reasons, however, the method described here is particularly useful with an electron source such as a GIS-EE.

In particular, the current density of the emitted electrons in a GIS-EE can also be used to efficiently control the lifetime of the generated ions. For example, the current density is kept as low as possible, which can be achieved by using the largest possible areas of the GIS-EE to achieve a high filtering effect. Such large areas can be realized, for example, with the arrangements of FIGS. 3 and 4.

The filter performance thus scales with the area. Due to the thin-film structure of the GIS-EE with its small geometric dimensions, in particular the low thickness, the lamellar and lattice structures of FIGS. 3 and 4 can be implemented. This allows a high proportion of a cross-sectional area in a fluid channel 3 to be covered with emitted electrons by the ionizer. In this way, large cross-sectional areas of the fluid channel and thus high throughput as well as a high filter efficiency can be achieved at the same time.

Figure 5:
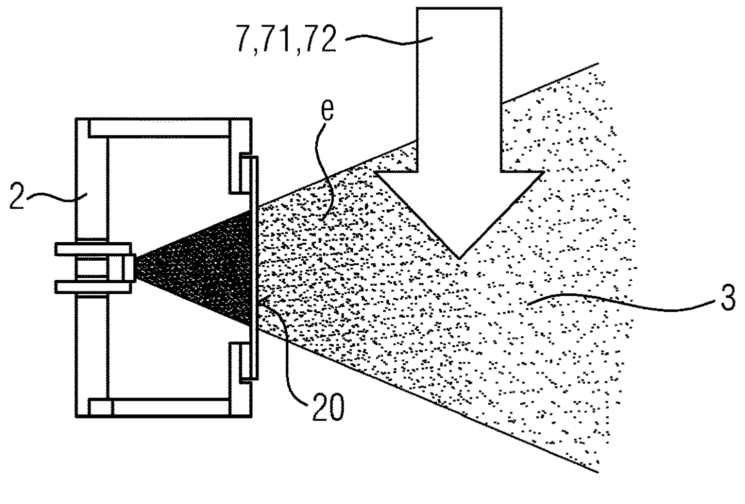

In the example of FIG. 5, the ionizer 2 is an electron source in which electrons e can be released, for example, at a heating wire or also by a field emitter array, and can subsequently accelerated within the ionizer 2. The emission side 20 is formed by an exit window of the ionizer 2. The exit window allow transmission of the electrons e and may be formed, for example, by a carbon layer or by one of the materials mentioned above for the gate electrode. Furthermore, such an electron source is preferably internally evacuated, for example, supported by a getter in the housing, in order to achieve a sufficient lifetime of the heating wire or the field emitter array. The fluid 7 is guided past the exit window, so that the exit window is directly adjacent to the fluid channel 3.

In all other respects, the comments on FIGS. 1 to 4 apply in the same way to FIG. 5, and vice versa.

Figure 6:
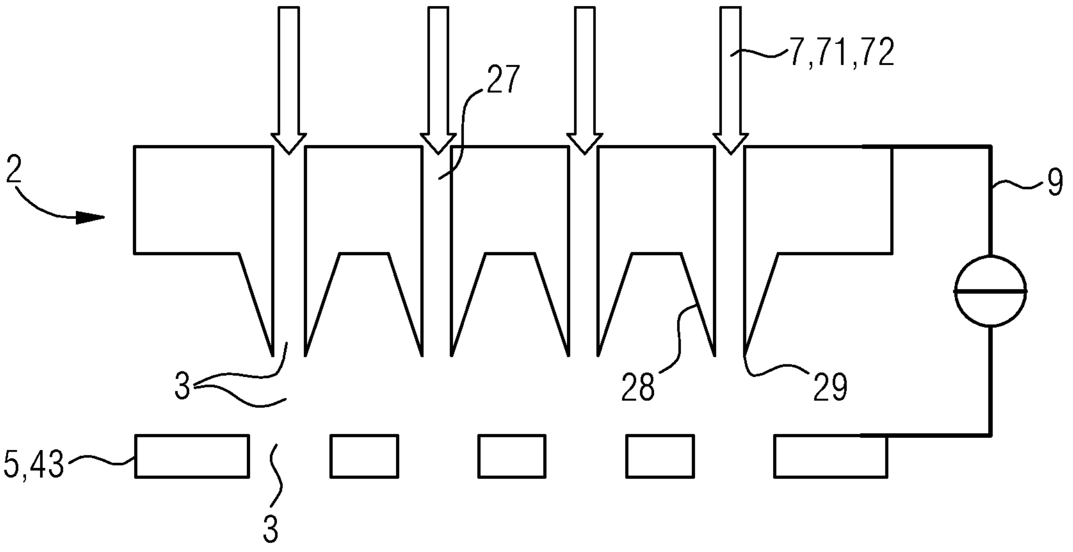

In the example of FIG. 6, the ionizer 2 is designed as a field ionizer or as an electrospray ionizer, although a triboionizer design is also possible. Thus, the ionizer 2 optionally has a plurality of micro-channels 27 extending through needles 28. Facing the needles 28 there is, for example, the accelerating electrode 43. A diameter of the micro-channels 27 is, for example, between 0.1 μm and 10 μm inclusive or between 1 μrn and 100 μm inclusive. The ionizer 2 is, for example, a MEMS device. The fluid 7 is conveyed through the micro-channels 27, for example, by means of MEMS pumps, not drawn.

Ionization of the fluid 7 occurs in particular at tips 29 of the needles 28 due to a local field increase. Depending on the voltage selected, the components 71, 72 can be selectively ionized in a targeted manner.

In all other respects, the comments on FIGS. 1 to 5 apply in the same way to FIG. 6, and vice versa.

The ionizers 2 of FIGS. 3 to 6 can also be used in all other embodiments of the gas filter system 1, including in every combination with each other, for example, to generate different electron energies.

Figure 7:
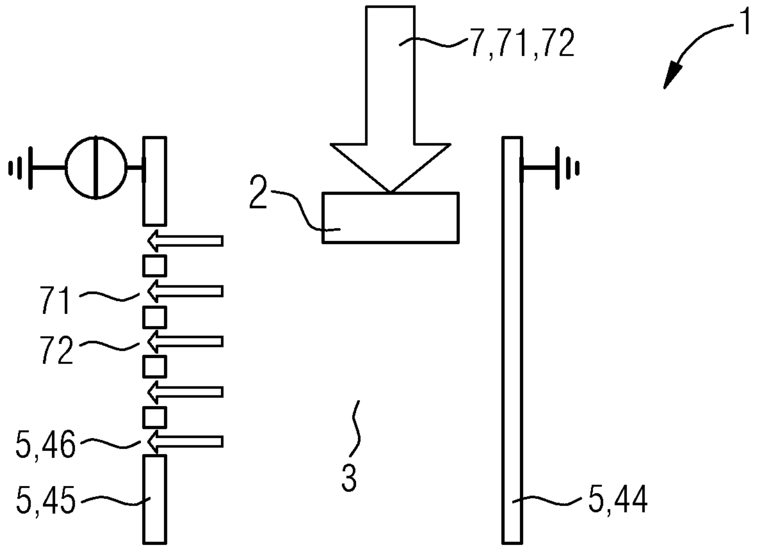
FIGS. 7 to 9 show schematic sectional views of separation methods for filter systems according to embodiments.

FIG. 7 shows a possible separation by the ionization probability for the especially gaseous fluid 7. Between the field electrodes 44, 45 a, for example, homogeneous electric field is generated. Through this electric field, the generated ions can be extracted and thus a separation is achieved via an upstream ionization of special gas molecules.

Figure 8:
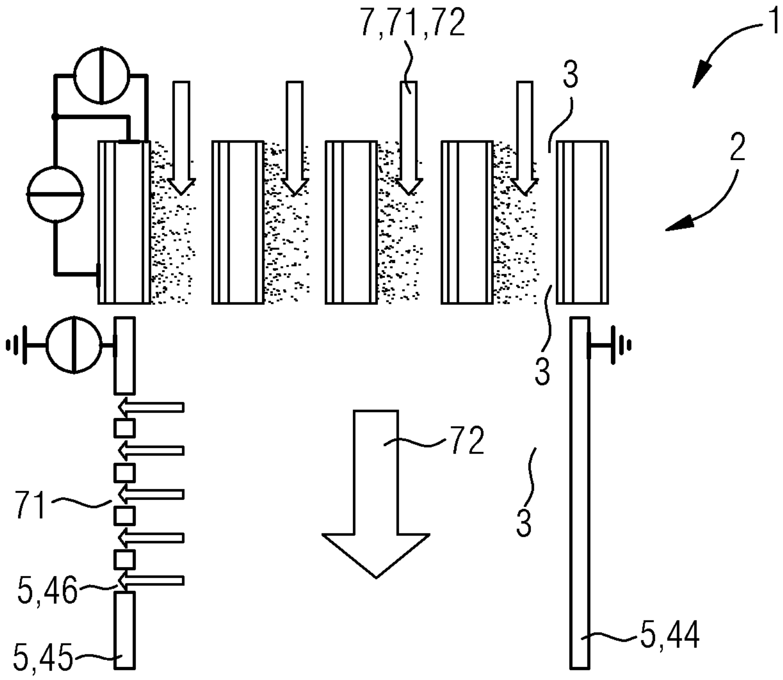

FIG. 8 illustrates how a filter cell can be constructed from the separation stage of FIG. 7. The fluid 7 flows through a plurality of the lamellae 41 and is ionized with a certain energy. By the special choice of the energy, preferably only a certain part of the components of the fluid 7 is ionized and thus a filtering is achieved by the extraction of the ions.

Figure 9:
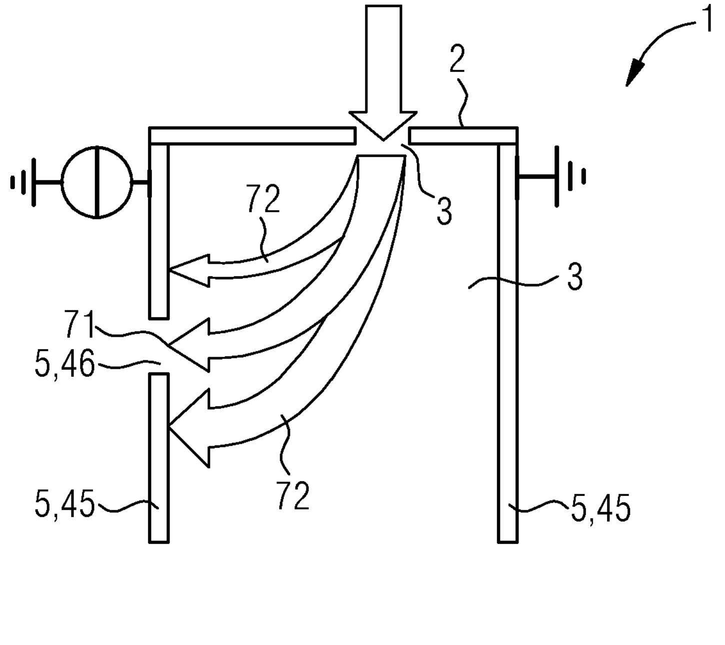

FIG. 9 shows a possible separation based on the mobility of the ions. An electric field is generated by the field electrodes 44, 45, which accelerates the ions perpendicular to the flow direction towards the outlet side. Due to a special location of the outlet 46, only certain trajectories of the ions reach the outlet 46, determined by the electric field as well as the mobility of the ions. Alternatively, a deflection of the ions by a magnetic field perpendicular to the drawing plane is also possible.

In all other respects, the comments on FIGS. 1 to 6 apply in the same way to FIGS. 7 to 9, and vice versa.

In particular in FIGS. 10 to 13, the at least one ionizer 2 and the respective at least one separation unit 5 are schematically drawn as separate blocks. In the actual technical implementation, the at least one ionizer 2 and the at least one separation unit 5 may spatially overlap or even be spatially congruent, as partly indicated by the reference signs. In this respect, the spatial arrangement shown in the figures is highly simplified.

Figure 10:
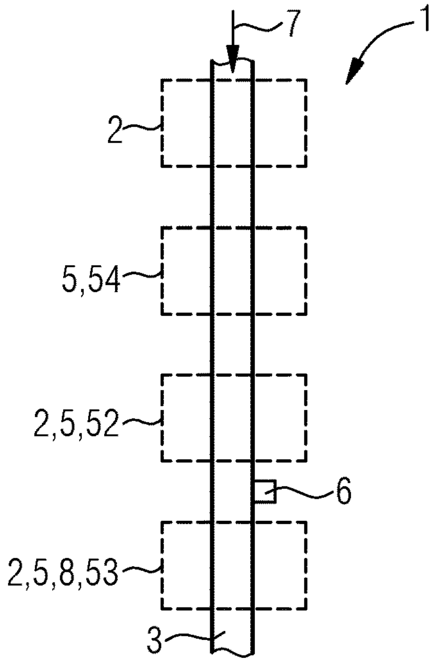
FIGS. 10 to 13 show schematic sectional views of filter systems according to embodiments.

FIG. 10 shows an example in which the gas filter system 1 is used in particular to filter out $CO_2$ from the atmosphere. The atmosphere is, for example, normal ambient air especially at atmospheric pressure, that is, at about 1013 hPa. The separation unit 5 may optionally be composed of several sub-stages 54, 52, 53.

The ionizer 2, for example, a GIS-EE, is followed by an APCI as sub-stage 54, for example, in order to ionize $CO_2$ present in a low concentration and to carry out an electrostatic separation of the ionized gas, that is, in particular of the $CO_2$ molecules, from the non-ionized fraction. By further use of the ionized fraction, most of the atmospheric nitrogen can be removed.

In a subsequent second sub-stage 52, direct ionization of the pre-filtered volume is performed with electrons having an energy of 15 eV or less and electrostatic separation is performed to remove residual nitrogen.

Subsequently, in a further, third sub-stage 53, direct ionization is carried out with electrons having an energy of at most 14 eV and electrostatic removal of the ionized portion to remove oxygen.

This enables a high overall filter performance as well as a high output concentration of $CO_2$.

The storage unit 8 for $CO_2$ can be connected to the third sub-stage 53.

Optionally, it is possible that a detection stage 6 is included in the gas filter system 1, for example, between the second and third sub-stages 52, 53.

In all other respects, the comments on FIGS. 1 to 9 apply in the same way to Figure and vice versa.

Figure 11:
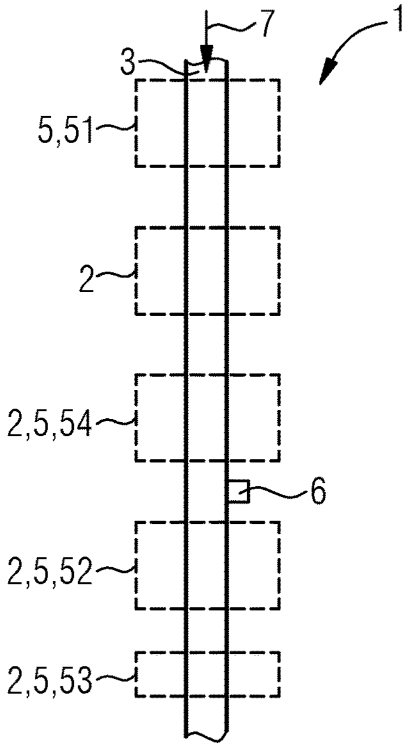

The gas filter system 1 of FIG. 11 is also used in particular for $CO_2$ filtration. In a first sub-stage 51, smoke particles are decomposed, for example, by plasma ionization, whereby larger particles are fragmented and a high ion density can be achieved. The first sub-stage 51 can comprise the ionizer 2 or optionally an ionizer 2 is connected downstream of this first sub-stage 51.

This is followed by filtering by ion mobility in a second sub-stage 54, which could further separate larger molecules.

Furthermore, direct ionization of the pre-filtered volume is carried out in a third sub-stage 52 with electron energies of at most 15 eV and electrostatic separation of the ionized gas from the non-ionized portion.

This is followed, in a fourth sub-stage 53, by direct ionization with electron energies of 14 eV or less and electrostatic removal of the ionized portion to remove the oxygen.

This enables filtering even in smoke. Due to a compact design of the gas filter system 1, integration in vehicles, such as motor vehicles, is also conceivable. Furthermore, use directly in an exhaust gas stream of an internal combustion power plant is feasible.

In all other respects, the comments on FIGS. 1 to 10 apply in the same way to Figure ii, and vice versa.

Figure 12:
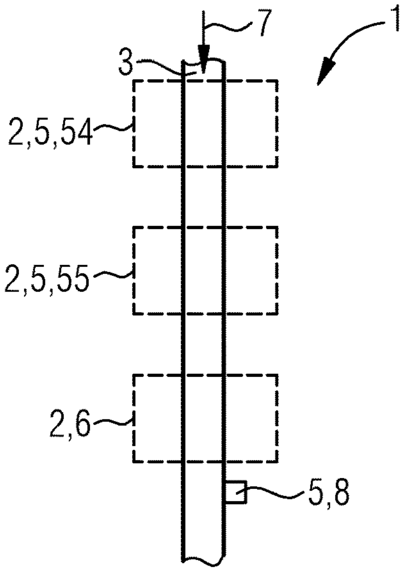

In the example of FIG. 12, benzene is detected in the presence of toluene and the constituents 71, 72 are separated accordingly. First, benzene and toluene can be separated from nitrogen over a long distance by an APCI of a first sub-stage 54.

In the second sub-stage 55, a reaction time after ionization can be adjusted such that the ionized benzene molecules give their charge to the benzene, thereby filtering the benzene.

By means of a renewed ionization and, for example, an IMS in detection step 6, a toluene concentration can now be determined, with suitable calibration.

If necessary, disposal of toluene is possible and/or another partial stage may be available for further gas purification.

In all other respects, the comments on FIGS. 1 to 11 apply in the same way to FIG. 12, and vice versa.

Figure 13:
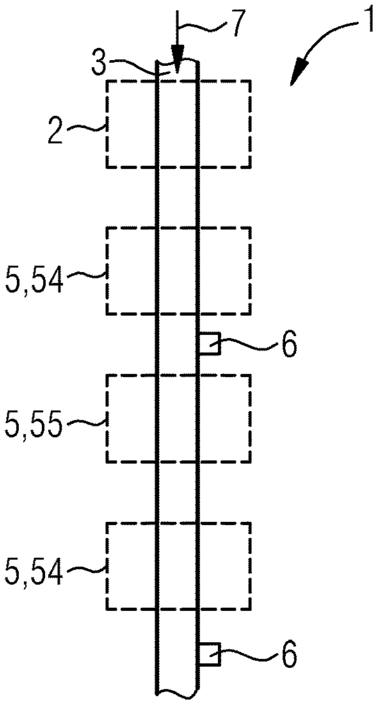

With the filter system 1, it is also possible to detect small amounts of substances in the fluid 7, see the embodiment according to FIG. 13.

In order to be able to examine liquids, electrospray ionization can be implemented as the first ionization, for example, with a micro-spray emitter. An APCI and/or IMS as the first sub-stage 54 is preferably connected downstream. Hereby the detection unit 6 can be realized. In particular, APCI designates the ionization mode and IMS the detection mode.

In order to reduce cross-sensitivities in the measurement here as well, further different sub-stages can be present downstream, which separate according to different properties, for example.

Thus, direct detection of minute amounts of substances with sufficient cross-sensitivity is achievable by using the filter system 1 with a stepwise, cascaded separation unit 5.

In all other respects, the comments on FIGS. 1 to 12 apply in the same way to FIG. 13, and vice versa.

In summary, molecular filtration by ionization and subsequent separation is possible with the filter system 1 and the separation method described herein, which can also be used for detection. Ionization possibilities in all embodiments for the ionizer 2 are in particular, individually and in combination: electron bombardment, in particular by means of a hot electron emitter such as the GIS-EE or a vacuum encapsulated electron source, field ionization at a field emitter array or at a micro-spray emitter, triboionization by using a capillary, in particular a micor-spray emitter, photoionization, plasma ionization by DBD and/or a corona source, electrospray ionization.

Component separation can be based on one or more of the following principles: ionization probability, ionization energy, electron capture relative to ionization, ion species, ion mobility. A combination of different methods can be used to achieve high input filter performance and high concentration of the target species at the output of the filter system.

A structure of the separation unit and the sub-stages is made in particular either by discrete ionization zones and separation zones or continuously along active zones. Adaptation to varying conditions of the fluid 7 entering the filter system 1 can be achieved by varying the electron energy, an applied voltage, the gas flow and the partitioning between the individual stages.

The separation is adjusted, for example, by, individually or in combination: temperature, pressure, intensity of ionization, electron energy, timed ionization, added humidity or other artificially added gas components.

Possible applications of the filter system 1 described herein are, for example, in $CO_2$ scrubbing or also generally in the filtering of molecules from a gas, where the following aspects may be given individually or in any combination:

- Continuous wave operation, also referred to as CW, is possible, unlike in amine scrubbing.
- The process described herein is more energy efficient since no heating is required and only relatively low voltages need to be applied to the ionizer 2 when a GIS-EE is used.
- The filter system 1 can have a compact design and can thus also be used directly at $CO_2$ sources, such as chimneys or exhausts, in industry for exhaust gas purification and can be insensitive to smoke.
- A combination with common processes, in particular for $CO_2$ separation, is conceivable. In this way, for example, the $CO_2$ concentration can first be significantly increased with the filter system 1 described here before other processes are used.
- In general, filtering of other gases is also possible, especially of hazardous substances such as toluene. Filtering of other gases that are harmful to the climate, such as methane, or of hazardous substances in the workplace can also be implemented.
- A possible application is benzene monitoring or generally monitoring a gas for substances with unfavorable cross-sensitivity in common procedures, where immediate monitoring is possible, even in the presence of electron affine analytes. Depending on the species or molecule to be detected and separated, a suitable combination of sub-stages of the separation unit is conceivable.

The invention described herein is not limited by the description based on the embodiments. Rather, the invention encompasses any new feature as well as any combination of features, which in particular includes any combination of features in the patent claims, even if this feature or combination itself is not explicitly stated in the patent claims or embodiments.

What is claimed is:

1. A filter system comprising:

a fluid channel configured to guide a fluid to be separated into at least two constituents;

an ionizer in or at the fluid channel, the ionizer configured to at least partially ionize the fluid into ions; and a separation unit in or at the fluid channel, the separation unit arranged downstream of the ionizer and configured to separate the at least two constituents from one another and to guide the at least two constituents separately from one another, wherein the ionizer comprises at least one gate-insulator-substrate electron-emission structure (GIS-EE), wherein the at least one GIS-EE is configured to emit low-energy electrons causing the ions, wherein the at least one GIS-EE comprises:

an electrically conductive substrate, an insulator layer of a dielectric material located on the substrate, a gate electrode of a further electrically conductive material located directly on the insulator layer, a first electrical connection structure located on the substrate, and a second electrical connection structure located on the gate electrode, wherein the at least one GIS-EE is divided into a plurality of lamellae, or the at least one GIS-EE is lattice-shaped and is penetrated by a plurality of holes, or the lamellae or a lattice with the holes is realized by a plurality of GIS-EEs, and wherein intermediate spaces between the lamellae or the holes are included in the fluid channel.

2. The filter system according to claim 1, wherein the gate electrode comprises carbon and has a thickness of at most 10 nm.

3. A filter system comprising:

a fluid channel configured to guide a fluid to be separated into at least two constituents;

an ionizer in or at the fluid channel, the ionizer configured to at least partially ionize the fluid into ions; and a separation unit in or at the fluid channel, the separation unit arranged downstream of the ionizer and configured to separate the at least two constituents from one another and to guide the at least two constituents separately from one another, wherein the ionizer comprises at least one gate-insulator-substrate electron-emission structure (GIS-EE), wherein the at least one GIS-EE is configured to emit low-energy electrons causing the ions, wherein the at least one GIS-EE comprises:

an electrically conductive substrate, an insulator layer of a dielectric material located on the substrate, a gate electrode of a further electrically conductive material located directly on the insulator layer, a first electrical connection structure located on the substrate, and a second electrical connection structure located on the gate electrode, wherein the at least one GIS-EE is divided into a plurality of lamellae, or the at least one GIS-EE is lattice-shaped and is penetrated by a plurality of holes, or the lamellae or a lattice with the holes is realized by a plurality of GIS-EEs, wherein intermediate spaces between the lamellae or the holes are included in the fluid channel, wherein the low-energy electrons have a kinetic energy of at least 1.5 eV and of at most 50 eV, wherein a first one of the constituents is $CO_2$, such that the filter system is configured to reduce a $CO_2$ content of the fluid and the fluid is air or a combustion exhaust gas, and wherein each of the ionizer and the separation unit comprises a plurality of subunits arranged alternately with one another.

4. The filter system according to claim 1, wherein a first one of the constituents is $CO_2$, such that the filter system is configured to reduce a $CO_2$ content of the fluid, and wherein the fluid is air or a combustion exhaust gas.

5. The filter system according to claim 1, wherein a second one of the constituents is toluene, such that the filter system is configured to reduce a toluene content of the fluid, and wherein the fluid is a benzene-containing gas or is benzene-containing air.

6. The filter system according to claim 1, wherein the filter system is configured to utilize one or more of the following ionization principles: electron impact ionization, field ionization, tribo ionization, photoionization, plasma ionization or electrospray ionization, and wherein the separation unit is configured to utilize one or more of the following principles: ionization probability, ionization energy, electron capture, ion species, or ion mobility.

7. The filter system according to claim 1, wherein the separation unit comprises a plurality of sub-stages arranged in cascade one after the other, or continuously along the fluid channel.

8. The filter system according to claim 7, wherein a first one of the sub-stages is configured to decompose smoke particles by plasma ionization.

9. The filter system according to claim 7, wherein a second one of the sub-stages is configured to discharge ionized nitrogen so that a concentration of at least one of the at least two constituents takes place.

10. The filter system according to claim 9, wherein a third one of the sub-stages is configured to discharge ionized oxygen so that a further concentration of at least one of the at least two constituents takes place.

11. The filter system according to claim 7, wherein a fourth one of the sub-stages is configured to change a trajectory of the ions depending on their mobility so that the ions are separated from one another by their mobility.

12. The filter system according to claim 1, further comprising an energy recovery unit configured to collect at least part of the ions and to recover at least part of their ionization energy.

13. The filter system according to claim 1, further comprising a follow-up reaction unit configured to utilize the ions for a subsequent reaction.

14. The filter system according to claim 1, wherein an electron-emitting surface of the ionizer has a length of at least 1 cm seen along the fluid channel.

15. The filter system according to claim 1, wherein each of the ionizer and the separation unit comprises a plurality of subunits arranged alternately with one another.

16. A method for operating the filter system according to claim 1, the method comprising:

passing the fluid to be separated through the fluid channel past the ionizer;

at least partially ionizing the fluid with the ionizer; and at least partially separating the at least two constituents of the fluid from each other with the separation unit.

* * * * *